No. 626,124. Patented May 30, 1899.
S. YANKAUER.
CLINICAL THERMOMETER.
(Application filed June 7, 1898.)
(No Model.)
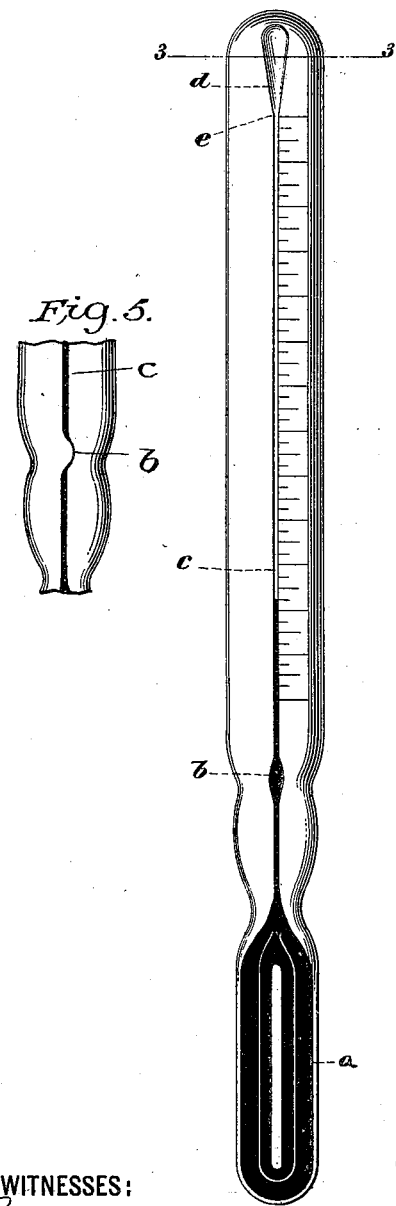
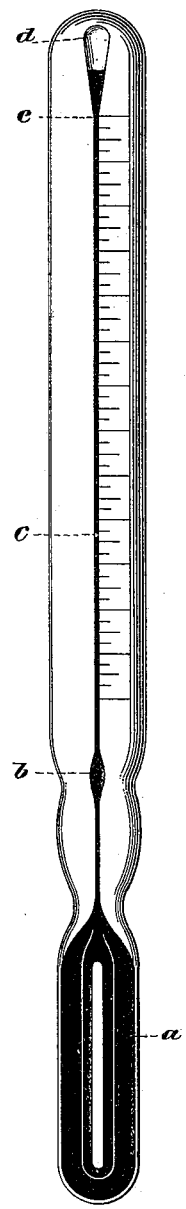
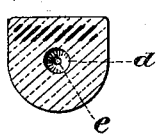
WITNESSES:
INVENTOR
Sidney Yankauer
BY
ATTORNEYS

UNITED STATES PATENT OFFICE.

SIDNEY YANKAUER, OF NEW YORK, N. Y.

CLINICAL THERMOMETER

SPECIFICATION forming part of Letters Patent No. 626,124, dated May 30, 1899.

Application filed June 7, 1898. Serial No. 682,813. (No model.)

*To all whom it may concern:*

Be it known that I, SIDNEY YANKAUER, residing in the city of New York, borough of Manhattan, county and State of New York, have invented certain new and useful Improvements in Clinical Thermometers, of which the following is a specification.

My invention relates to thermometers, more especially to that class of thermometers known as "clinical" thermometers.

My invention has for its object to construct a thermometer which is capable of being safely heated to a point beyond that marked by the highest point of the scale-tube for the purposes of sterilization and other purposes, so that the thermometer, which can be used in the ordinary manner, may be boiled for the purpose of sterilization without danger of breaking the same and which will not be broken by a careless immersion in hot water.

Broadly speaking, the invention consists in a thermometer having a constriction or registering device and a vacuum expansion-chamber communicating with the bore of the thermometer, into which chamber the mercury can expand when the thermometer is unduly heated without danger of breaking the thermometer, which expansion-chamber is of such form as to insure the ready return of the mercury to the scale-tube.

In the accompanying drawings I have shown a thermometer embodying my invention, which structure is, as far as I have been able to determine, the most efficient form in which my invention may be clothed.

In the drawings, Figure 1 is a front view of a thermometer embodying my invention, showing the same in its normal condition. Fig. 2 is a similar view thereof, showing the same as it will appear when dipped in boiling water for the purposes of sterilization. Fig. 3 is a section on line 3 3 of Fig. 1. Fig. 4 is an enlarged detail view of the upper end of the scale-tube and the expansion-chamber, and Fig. 5 is a fragmentary side view of a part of the tube containing the registering constriction.

In the drawings, *a* is a bulb of the thermometer, containing an expansible liquid, preferably mercury.

*b* is the "registering" device, so called, consisting of a constriction or other means to retard the flow of mercury in the tube. The bore of the scale-tube is lettered *c* and the expansion-chamber *d*, which in the present instance is shown as a gradually-tapered conical chamber constituting an extension of the bore of the scale-tube *c*. The apex of the cone communicates with the scale-tube, and the chamber is made of this form in order that the mercury may be readily returned to the scale-tube, as the surface tension of the mercury is so great that if a shoulder were formed at *e* it would be difficult, if not impossible, to shake the mercury back into the scale-tube after the thermometer had been sterilized by boiling. This chamber *d* may be blown in the thermometer at any convenient stage in the construction of the same, and it in no way interferes with any of the procedures necessary to the construction of the thermometer. The bore of the tube is of such diameter as to support the mercury therein from flowing by its own weight. For the want of a better term I call such a tube a "capillary" tube. The expansion-chamber is exhausted of air. By "exhausted of air" I do not necessarily mean entirely exhausted, as such effect is not practicable, but only exhausted to such a pressure therein as will not be effective to overcome the surface tension of the mercury to drive the same in the scale-tube. The amount of mercury contained in the thermometer is such that at clinical temperatures (90° to 115° Fahrenheit) the mercury stands high in the scale-tube, as is usual in clinical thermometers, so that it will effect a normal registry at clinical temperatures, and the total volume of mercury is such that at a boiling temperature (212° or thereabout) the said volume will not exceed the volume of the interior spaces (bulb-bore and expansion-chamber) of the thermometer.

It will be readily apparent that clinical thermometers thus constructed have many advantages, chief among which are: Accidental immersion in hot water cannot break the thermometer. The thermometer can be boiled, thereby sterilizing it. Many important results flow from these advantages, as it is an established fact that the mouth of an apparently healthy person contains a great variety of bacteria, even such as cause certain diseases, such as diphtheria and pneumonia.

The specific virus of most acute infectious diseases—such as scarlet fever, measles, yellow fever, diphtheria, tonsilitis, &c.—and of syphilis and tuberculosis are contained in the mouth of the person suffering from such diseases, and the germs of typhoid fever, dysentery, anthrax, cholera, typhus, &c., are contained in the rectum of the patient. A thermometer which has been inserted into the mouth of a person suffering from one of the above and other diseases becomes a carrier of infection to healthy persons unless the thermometer be sterilized. Not only for the above reasons, but for purposes of ordinary cleanliness, a clinical thermometer should be carefully sterilized after use. A practicing physician finds it difficult to carry around with him proper apparatus for sterilizing a thermometer, and as clinical thermometers break when dipped in boiling water it has heretofore been very difficult to properly sterilize thermometers when making sick calls. By my invention, however, a physician is enabled to efficiently sterilize his thermometer after each use, as all that it is necessary to do is to procure boiling water and dip the thermometer therein.

Having described my invention, what I claim, and desire to secure by Letters Patent, is—

In a clinical thermometer, the combination of a bulb, containing a small quantity of mercury, a tube leading therefrom of sufficiently small diameter to prevent the column of mercury therein from flowing by its own weight in any position of the thermometer, a constriction in said tube near the bulb, sufficiently small to break the column at this point when the bulb cools and a funnel-shaped expansion-chamber at the extreme upper end of the tube normally containing a vacuum of such low pressure as not to force the column of mercury past the constriction.

SIDNEY YANKAUER.

Witnesses:
CHARLES E. SMITH,
OTTO V. SCHRENK.